United States Patent Office 3,450,782
Patented June 17, 1969

3,450,782
PROCESS FOR THE PREPARATION OF CYCLIC ALKANES
Daniel S. Connor, Cincinnati, Ohio, assignor to The Procter & Gamble Company, Cincinnati, Ohio, a corporation of Ohio
No Drawing. Filed Nov. 29, 1967, Ser. No. 686,738
Int. Cl. C07c 1/28
U.S. Cl. 260—666      8 Claims

ABSTRACT OF THE DISCLOSURE

This invention concerns the preparation of cyclic alkanes from dihalogenated alkanes using lithium amalgam.

OBJECTS OF THE INVENTION

The object of this invention is to prepare cyclic alkanes from the halogenated straight chain starting materials using lithium amalgam to remove the halogens and form a cyclic compound.

A further object of this invention is to prepare known cyclic compounds useful as anesthetics.

Another object of this invention is to prepare known cyclic compounds having a greater energy level than their analogous straight chain compounds.

A further object of this invention is the preparation of known cyclic compounds in yields which are not available with methods heretofore known.

An additional object of this invention is to prepare known cyclic compounds heretofore difficult to synthesize.

BACKGROUND OF THE INVENTION

The Wurtz reaction using sodium in toluene to couple hydrocarbon groups by removal of halogens is known as a synthesis method for some cyclic compounds. However, because of the poor yields and the availability of alternate routes, the use of the Wurtz reaction in cyclization has been severely limited. In fact, it has been limited almost exclusively to the closures of three-membered rings—for example, the preparation of cyclopropane in an 80% yield. H. B. Hass, E. I. McBee, G. E. Hinds, and E. S. Gluesenkamp, Ind. Eng. Chem., 28, 1178 (1936). Other examples of ring closure include the synthesis of spiro [2.5]-octane, R. W. Shortridge, R. A. Craig, K. W. Greenlee, J. M. Derfee, and C. E. Boord., J. Am. Chem. Soc. 70, 946 (1948) and spiropentane, D. E. Applequist, G. F. Fanta, and B. W. Henrikson, J. Org. Chem., 23 1715 (1958) using pentaerythrityl tetromide and zinc metal with a simultaneous removal of zinc ions as they form using tetrasodium ethylenediaminetetraacetate. No successful synthesis of a four membered ring system, e.g., cyclobutane, using the Wurtz synthesis was reported for over 50 years. Unsuccessful attempts were reported by the following: H. G. Colman and W. H. Parkin, Jr., J. Chem. Soc., 53, 201 (1888); D. Philipoff, J. prakt. chem., 93, 177 (1916); J. P. Wilrant, Rec. Trav. Chem., 58, 329 (1939); and R. C. Krug, Ph.D. Dissertation, Ohio State University (1944).

Cyclobutane was finally prepared using 1,4-dibromobutane and sodium in refluxing toluene at a 7% yield, J. Cason and R. L. Way, J. Org. Chem., 14, 31 (1949) and using lithium in reflexing ether at a 20% yield, Burger, German Patent 832,750. Ring closure to form bicyclic compounds, similar to the straight chain ring closure situation, has had only limited success. Bicyclo [1.1.0]butane has been synthesized by the treatment of 1,3-dibromocyclobutane with sodium inrefluxing dioxane, K. B. Wiberg, G. M. Lampman, R. P. Ciula, D. S. Connor, P. Scherter, and J. Lavanesh, Tetrahedron, 21, 2749 (1695), bicyclo[1.1.1]pentane by treatment of 3-(bromomethyl)-cyclobutyl bromide with sodium metal at a 0.5% yield, with lithium amalgam in refluxing dioxane at a 4.2% yield and with sodium/naphtahalene at a 8% yield, K. B. Wiberg, D. S. Connor, and G. M. Lampman, Tetrahedron Letters, 531 (1964); K. B. Wiberg and D. S. Connor, J. Am. Chem. Soc., 88, 4437 (1966).

On examination of the literature hereinbefore cited on cyclization, it is apparent that the yields obtained were extremely low, that the conditions for reaction when it did occur were quite severe, and that the starting materials used were less than common.

SUMMARY OF THE INVENTION

The use of the method of this invention to obtain cyclic compounds provides a valuable synthetic tool heretofore unknown to chemists, thus enabling the production of valuable end products. For example, the cyclization of butane to cyclobutane provides a compound with an increased energy source over that available with the straight chain entity. Butane is well known as a fuel source, e.g., as a lighter fuel or in any application requiring a combustible material that is readily volatile and has a low flash point for combustion. Cyclobutane can be advantageous substituted for butane in numerous applications. The cyclization of pentane to cyclopentane yields, as is well known, a solvent useful in many different applications. The cyclization of propane to cyclopropane results in a product that is well known as an anaesthetic.

This invention involves the intramolecular reaction of a dihaloalkane in the presence of lithium amalgam to form the cyclic compound and the production of lithium halide according to the following schematic:

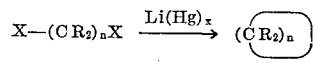

where X is a halogen, R is a hydrogen or a hydrocarbon group and $n$ is an integer. Cyclization using lithium amalgam has been used in the prior art to form bicyclo[1.1.1]-pentane from 3-(bromomethyl)cyclobutylbromide. This reaction yielded primarily 1,4-pentadiene and production of bicyclo[1.1.1]pentane occurred only in a 4.2% yield. The cyclization of straight chain dihaloalkanes in good yields with the present invention was unexpected because of the smaller probability that the halogens would be spatially arranged such that cyclization would occur. This is in contrast to the situation involved in the formation of a bicyclic since the possible spatial configurations are well defined due to the cyclic nature of the starting material. Again, it was unexpected that cyclization in good yields would occur with straight chain dihaloalkanes and lithium amalgam. Rather telomerization would be expected to occur based on the known difficulty, as demonstrated by the prior art hereinbefore described, in forming cyclic structures from straight chain starting materials.

Dihaloalkanes

The dihaloalkanes of this invention are of the following general formula

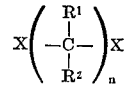

where each $R^1$ and $R^2$ is selected from the group consisting of hydrogen, alkyl, aryl, alkaryl, aralkyl, cyclic, heterocyclic groups, and, when taken together in pairs, bivalent alkylene groups, having from 1 to about 20 carbon atoms, which heteroatoms in the heterocyclic groups can be sulfur and oxygen, and mixtures of the entities hereinbefore described, wherein $n$ is an integrer from 3 to about 20 and is determined prior to the selection of said $R^1$ and $R^2$ groups, wherein each X is selected from the group consisting of bromine, chlorine, and iodine, and wherein the total number of carbon atoms in the dihaloalkane is less than 30.

Where $R^1$ and $R^2$ are alkyl or aralkyl, examples of suitable groups are as follows: methyl, ethyl, propyl, n-butyl, isobutyl, n-pentyl, 2,3-dimethylpentyl, n-hexyl, 3-ethylhexyl, n-octyl, isooctyl, n-nonyl, n-decyl, n-undecyl, tripropylene, n-dodecyl, tetrapropylene, n-tridecyl, n-tetradecyl, 6-hexyltetradecyl, 5-ethyl-2,2-dimethyltridecyl, n-pentadecyl, 2,5,8,11-tetraethylpentadecyl, n-hexadecyl, n-octadecyl, eicosyl, 4-phenylbutyl, 6-naphthylhexyl, and 12-phenyldodecyl; where $R^1$ and $R^2$ are aryl or alkaryl, suitable groups are as follows: phenyl, biphenyl, triphenyl, naphthyl, anthracyl, anthranthryl, phenanthryl, 3-butylphenyl, 3-dodecylphenyl, tetrapropylenephenyl, 8-hexylnaphthyl, 8-benzylnaphthyl, and 4-dodecylnaphthyl; where $R^1$ and $R^2$ are cyclic or heterocyclic, suitable groups are as follows. cyclopropyl, cyclobutyl, cyclopentyl, cyclohexyl, cycloheptyl, methylcyclohexyl, dodecyclohexyl, cyclopentyltetradecyl, cyclooctyl, furanyl, thiophenyl, pyranyl, and thiopyranyl: where $R^1$ and $R^2$ are taken together to be a bivalent alkylene group, suitable groups are methylene, ethylene, propylene, butylene, pentylene, hexylene, dodecalene, and eicosylene.

In the dihaloalkane, it is preferred that $n$ range from 3 to about 8 and that each $R^1$ and $R^2$ is hydrogen, e.g., 1,3-dibromopropane, 1,3-dichloropropane, 1,4-dibromobutane, 1,5-dibromopentane, 1-chloro-4-bromobutane, 1,4-dibromopentane, and 1,6-dibromohexane. Dihaloalkanes wherein at least one group ($R^1$ or $R^2$) is a short chain alkyl group having from 1 to about 5 carbon atoms, such as methyl, ethyl, or propyl, with the remaining group being hydrogen are also preferred. The preferred halogen is bromine.

Dihaloalkanes in which one or both of the halogens are non-terminally substituted are suitable for the purposes of this invention, e.g., 1,3-dihalobutane, 1,4-dihalopentane, 2,4-dihalohexane. The only requirement for ring-closure to form a cyclic system is that the halogens not be substituted on adjacent carbon atoms. Dihaloalkanes in which the size of the ring formed in the reaction is from 3 to about 8 are preferred because of greater yields. Yields are also satisfactory in cyclizations where the ring formed is above 15 carbon atoms. With dihaloalkanes in which the carbon structure separating the halogens contains between about 9 carbon atoms to about 14 carbon atoms, telomerization as opposed to ring closure tends to occur and as a result yields of the corresponding cyclic alkanes are lower. The reduction in yields is well known, in that with other synthesis methods of the prior art, minimum yields have been reported where ring closure results in rings of about 10 carbons. However, with a proper adjustment of the conditions, e.g., lowering the concentration of the dihaloalkane, ring-closure can be enhanced and telomerization minimized.

Lithium amalgam

The lithium amalgam, Li(Hg)$_x$, is formed by dissolving lithium metal in elemental mercury. Although the ratio of lithium to mercury is not a critical consideration, the reaction proceeds more smoothly with low lithium concentrations because at low lithium concentrations the lithium amalgam formed is liquid. The usual range is from 0.1% to 2% lithium in mercury. The preferred percentage is 0.4% lithium.

The reaction is normally carried out in an inert atmosphere, such as nitrogen, although argon and helium are also suitable, and in a solvent medium. The lithium amalgam is placed in the solvent and the dihaloalkane added over a period of time. Suitable solvents are those that are stable to lithium amalgam, e.g., saturated hydrocarbons, such as pentane, hexane, octane, cyclopentane, and cyclohexane; aromatic hydrocarbons such as benzene, xylene, and toluene; or ether solvents such as dioxane, tetrahydrofuran, 1,2-dimethoxyethane, and diethyl ether. The dihaloalkane can be added as a pure material or dissolved in any of the aforementioned solvents. The concentration of the dihaloalkane in the solvent can range from 0.0001% to the actual addition of the pure dihaloalkane. The use of a solvent in the addition step at a dihaloalkane concentration of 25% is preferred. The reaction is normally run at the reflux temperature of the solvent and with the proper choice of solvents, the best conditions for maximum yields can be readily obtained. The temperature of the reaction can range from about 20° C. to about 150° C. The preferred temperature is about 100° C. The preferred solvent is dioxane. Tetrahydrofuran is also preferred as a solvent. The reaction is normally run for about 3 to 6 hours but it may be necessary to allow a longer reaction time depending on the conditions, reactants, solvents, and temperatures used. Usual gas chromatographic techniques can be used to follow the course of the reaction and the determination of the starting materials remaining.

The following examples are intended to be illustrative of the invention and are not intended to limit the scope of the invention nor the claims of the invention.

All percentages given herein are weight percent unless otherwise indicated.

EXAMPLE I (a) Preparation of lithium amalgam

Lithium metal wire (2.0 g., 0.29 g. at. wt.) available commercially was wiped free of most of the mineral oil and placed in a steel pipe, 6 inches long and ¾ inches in diameter, with 500 g. of triple vacuum distilled mercury. The pipe was capped at both ends after lubricating the threads lightly with graphite pipe threading compound. The pipe, just slightly less than 75% full, was suspended horizontally in a hood and was heated for about an hour over a low flame of a Meker burner. This was sufficient to give complete amalgamation. The resultant amalgam contained 0.4% lithium in mercury and consisted of solid needles plus some liquid. No trace of the lithium wire remained.

(b) Preparation of the solvents

Dioxane to be used as the solvent was purified by fractional distillation through a 10-plate column. The solvent was refluxed for several days over sodium metal and under a nitrogen blanket.

(c) Preparation of cycloubtane using lithium amalgam and 1,4-dibromobutane

The glass apparatus to be used was oven dried, joints greased with a silicone stopcock grease, and quickly assembled. The apparatus consisted of a 300 ml. three-necked flask, a Trubore shaft fitted with a Hirshberg stirrer, a small Allihn condenser, a Dry-Ice trap with a connection to a mercury U-tube, and 60 ml. pressure-equalizing addition funnel fitted with a nitrogen inlet tube. After sweeping the apparatus with pure, dry nitrogen, the contents of the steel pipe containing the lithium amalgam, as prepared in step (a) above, and 100 ml. dry dioxane, as prepared in step (b) above, were put into the three-neck flask. 1,4-dibromobutane (21.6 g., 0.10 mole) was dissolved in approximately 40 ml. of dry dioxane and poured into the addition funnel. The Dry Ice trap, connected above the water-cooled Allihn condenser, was cooled using a Dry-Ice/acetone mixture in a Dewar flask. After a final sweep of nitrogen, the nitrogen inlet hose was clamped at the addition funnel.

The dioxane in the three-neck flask was brought to reflux (101° C.) and the 1,4-dibromobutane/dioxane solution was added dropwise from the addition funnel with stirring over approximately a three-hour period. After one-half hour of additional refluxing, the contents of the reaction trap was transferred to a liquid nitrogen storage trap by bulb-to-bulb distillation. Gas chromatography results showed the product to be 99% pure cyclobutane. The NMR spectrum in carbon tetrachloride using tetramethylsilane as a reference showed only the singlet at τ8.03 expected of cyclobutane. The weight of cyclobutane collected using gas chromatographic techniques was 3.9 g. corresponding to a 70% yield.

When in the above example a molar equivalent amount of other dihaloalkanes are substituted for the 1,4-dibromobutane, substantially equivalent results are obtained in that the cycloalkanes are produced. For example, 1,3-dibromobutane, 1,5-dichloropentane, 1-chloro-4-bromopentane, or 1,3-diiodopropane can be so substituted.

EXAMPLE II

Preparation of cyclobutane using lithium amalgam and 1,4-dibromobutane

The apparatus, procedure, reactants and amounts as described in Example I above were used except that tetrahydrofuran, refluxing at 66° C., was substituted for the dioxane as the solvent. Gas chromatographic analysis indicated the crude volatile material was 99% pure cyclobutane. The weight of cyclobutane collected from gas chromatography was 3.6 g. corresponding to a 64% yield. The NMR spectrum of the product in carbon tetrahcloride using tetramethylsilane as a reference contained only the singlet at τ8.03 expected of cyclobutane.

EXAMPLE III

Preparation of cyclobutane using lithium amalgam and 1-chloro-4-bromobutane

The apparatus, procedure, reactants and amounts as described in Example I above were used except that 1-chloro-4-bromobutane (17.1 g., 0.10 mole) was substituted for the 1,4-dibromobutane. The volatile product collected in the trap was shown to be 99% pur cyclobutane by gas chromatography. Yields were 2.0 g. corresponding to 36% after 3 hours of refluxing and 3.2 g. corresponding to 57% after 24 hours of refluxing. The NMR spectrum in carbon tetrachloride using tetramethylsilane as the reference contained only the singlet at τ8.03 expected of cyclobutane.

EXAMPLE IV

Preparation of cyclobutane using lithium amalgam and 1,4-dichlorobutane

The apparatus, procedure, reactants and amounts as described in Example I were used except that 1,4-dichlorobutane (12.7 g., 0.10 mole) was substituted for the 1,4-dibromobutane. The volatile product collected in the trap was shown to be 99% pure cyclobutane by gas chromatography. The yield was 1.5 g. corresponding to 27% yield after 3 hours of refluxing. The NMR spectrum in carbon tetrachloride using tetramethylsilane as a reference contained only the singlet at τ8.03 expected of cyclobutane.

EXAMPLE V

Preparation of cyclopentane using lithium amalgam and 1,5-dibromopentane

The apparatus, procedure, reactants and amounts as described in Example I above were used except that 1,5-dibromopentane (23.0 g., 0.10 mole) was substituted for the 1,4-dibromobutane. After 3 hours addition time and ½ hour additional stirring time, the reaction mixture was cooled to room temperature and a vacuum pump was connected in place of the mercury U-tube. The bulk of the dioxane/cyclopentane was pumped over into a trap cooled with a Dry-Ice/acetone mixture. Separation of the cyclopentane from the solvent was performed on a spinning band column. The yield was 5.45 g. corresponding to 78% yield. The NMR spectrum in carbon tetrachloride using tetramethylsilane as a reference consisted only of the singlet at τ8.49 expected of cyclopentane.

EXAMPLE VI

Preparation of cyclodecane using lithium amalgam and 1,10-dibromodecane

Apparatus, procedure, reactants and amount as in Example I above were used except that 1,10-dibromodecane (30.0 g., 0.10 mole) was substituted for the 1,4-dibromobutane and tetrahyrofuran was used in place of the dioxane as the solvent. In the workup the organic layer was decanted from the mercury layer into 300 mls. of water. The water was extracted three times with 250 ml. portions of pentane and the combined pentane extracts were washed three times with water and dried over magnesium sulfate. The pentane was distilled off at atmospheric pressure. By distillation it was possible to cut the higher boiling residue into three fractions: 40°/4.5 mm. (0.2 g.), 74°/1 mm. (1.3 g.), and pot residues (14.5 g.). NMR analysis of these fractions indicated the presence of traces of cyclodecane for a total yield of ca. 0.05%. The other products were the result of intermolecular coupling (average:trimer) with traces of reduction (terminal methyl pesent in the NMR spectrum) and traces of elimination (terminal olefin present in the NMR spectrum).

The cyclobutane prepared in Example I–IV is useful as a cigarette lighter fuel and the cyclopentane prepared in Example V is a well known solvent. The cyclodecane is a useful intermediate in the preparation of perfume ingredients and in addition the cyclodecane can be used as a synthetic intermediate, for example, cyclodecane can be oxidized to the ketone and further oxidized to the dicarboxylic acid which when reacted with an alkylene diamine will polymerize to a nylon-type polymer.

What is claimed is:

1. A process for preparation of cyclic compounds comprising the step of reacting a compound of the following general formula

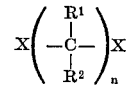

wherein each $R^1$ and $R^2$ is selected from the group consisting of hydrogen and alkyl having from 1 to 20 carbon atoms, wherein $n$ is an integer from 3 to 20 and is determined prior to the selection of said $R^1$ and $R^2$ groups, wherein each X is selected from the group consisting of bromine, chlorine, and iodine, wherein the total number of carbon atoms in said compound is less than 30, with lithium amalgam.

2. The process of claim 1 wherein $n$ is from 3 to about 10, $R^1$ and $R^2$ each are selected from the group consisting of hydrogen and methyl, ethyl and propyl, and each X is selected from the group consisting of bromine and chlorine, the reaction taking place at a temperature in the range of 20° C. to 150° C. in an inert atmosphere and in the presence of a solvent inert to lithium amalgam.

3. The process of claim 2 wherein $n$ is 4, $R^1$ and $R^2$ each are hydrogen and each X is bromine or chlorine.

4. The process of claim 2 wherein $n$ is 3, $R^1$ and $R^2$ each are hydrogen and each X is bromine or chlorine.

5. The process of claim 2 wherein $n$ is 5, $R^1$ and $R^2$ each are hydrogen and each X is bromine or chlorine.

6. The process of claim 2 wherein $n$ is 4, $R^1$ is methyl, $R^2$ is hydrogen, and each X is bromine or chlorine.

7. The process of claim 2 wherein $n$ is 6, $R^1$ and $R^2$ each are hydrogen and each X is bromine or chlorine.

8. The process of claim 2 wherein $n$ is 7, $R^1$ and $R^2$ each are hydrogen and each X is bromine or chlorine.

References Cited

UNITED STATES PATENTS

| | | | |
|---|---|---|---|
| 2,102,556 | 12/1937 | Hass | 260—666 |
| 2,496,419 | 2/1950 | Sommer | 260—666 |
| 2,954,411 | 9/1960 | Hawthorne | 260—666 |

FOREIGN PATENTS

| | | |
|---|---|---|
| 832,750 | 2/1952 | Germany. |

OTHER REFERENCES

W. B. Smith, J. Org. Chem., 23, 509–512, 1958.

J. B. Wiberg et al., J. Am. Chem. Soc., 88, 4437–41, 1966.

K. B. Wiberg et al., Tetrahedron Letters, No. 30, 2173–5, 1963.

K. B. Wiberg et al., Tetrahedron Letters, No. 10, 531–4, 1964.

DELBERT E. GANTZ, *Primary Examiner.*

V. O'KEEFE, *Assistant Examiner.*